United States Patent
Amidon

(10) Patent No.: US 7,602,351 B1
(45) Date of Patent: Oct. 13, 2009

(54) THREE-DIMENSIONAL DISPLAY ASSEMBLY

(75) Inventor: Charles Philip Amidon, Portsmouth, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 655 days.

(21) Appl. No.: 11/185,080

(22) Filed: Jul. 15, 2005

(51) Int. Cl.
*G09G 5/00* (2006.01)
(52) U.S. Cl. .............................. 345/6; 345/55; 345/204; 345/31; 345/32
(58) Field of Classification Search ................... 345/6, 345/55, 204, 31–32
See application file for complete search history.

(56) References Cited

U.S. PATENT DOCUMENTS

| | | | |
|---|---|---|---|
| 4,953,949 A | 9/1990 | Dallas | |
| 5,072,215 A | 12/1991 | Brotz | |
| 5,369,739 A | 11/1994 | Akeley | |
| 5,703,606 A | 12/1997 | Blundell | |
| 5,779,920 A | 7/1998 | Chadha et al. | |
| 5,952,988 A | 9/1999 | Moddel | |
| 6,005,608 A | 12/1999 | Chakrabarti | |
| 6,023,315 A * | 2/2000 | Harrold et al. | 349/108 |
| 2005/0036082 A1 * | 2/2005 | Lai | 349/61 |

FOREIGN PATENT DOCUMENTS

JP 08-062744 * 3/1996

* cited by examiner

*Primary Examiner*—Richard Hjerpe
*Assistant Examiner*—Leonid Shapiro
(74) *Attorney, Agent, or Firm*—James M. Kasschke; Jean-Paul A. Nasser; Michael P. Stanley

(57) ABSTRACT

An assembly for displaying three-dimensional images includes a base portion forming a housing adapted to house electronics and mechanics, and having a planar surface, a projection member disposed in a position removed from the base portion planar surface, drive rods extending from the base portion and connected to the projection member covered by a layer to mask/reveal selectable pixels, the drive rods being movable by electronics and mechanics disposed in the base portion to move the projection member through planes parallel to the base portion planar surface, and a transparent envelope enclosing the base portion planar surface, the drive rods, and the projection member, the envelope being adapted to contain a near vacuum therein.

15 Claims, 5 Drawing Sheets

THREE-DIMENSIONAL DISPLAY ASSEMBLY

STATEMENT OF GOVERNMENT INTEREST

The invention described herein may be manufactured and used by or for the Government of the United States of America for governmental purposes without the payment of any royalty thereon or therefore.

BACKGROUND OF THE INVENTION (1) Field of the Invention

The invention relates to an image display apparatus and is directed more particularly to an assembly for displaying a full color three-dimensional image to observers from any angle surrounding the apparatus.

(2) Description of the Prior Art

There are classes of information that are better understood when displayed three-dimensionally. This has been done using stereoscopic imagery and special viewing glasses. There are imagers with moving surface light generators and fiber optic point sources, but they suffer from inability to simulate solid form.

There is a need for a three-dimensional image display assembly which does not require wearable gear, such as special glasses, and which displays minimal hidden surfaces.

SUMMARY OF THE INVENTION

An object of the invention is, therefore, to provide an image display assembly which displays imagery in three dimensions without requiring special glasses or similar gear for an observer, and which displays images of objects with minimal display of hidden surfaces.

A further object of the invention is to provide such an assembly as facilitates viewing of the image from any direction surrounding the image.

With the above and other objects in view, a feature of the present invention is the provision of a display assembly for displaying three-dimensional images. The assembly comprises a base portion forming a housing adapted to house electronics and mechanics, and having a planar surface, a projection member disposed in a position removed from the base portion planar surface, drive rods extending from the base portion and connected to the projection member, the drive rods being movable by electronics and mechanics disposed in the base portion to move the projection member through planes parallel to the base portion planar surface, and a transparent envelope enclosing the base portion planar surface, the drive rods, and the projection member, the envelope being adapted to contain a near vacuum therein.

In accordance with a further feature of the invention, there is provided such an assembly that facilitates viewing of the images by observers from any direction surrounding the image.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENTS

Figure 1:
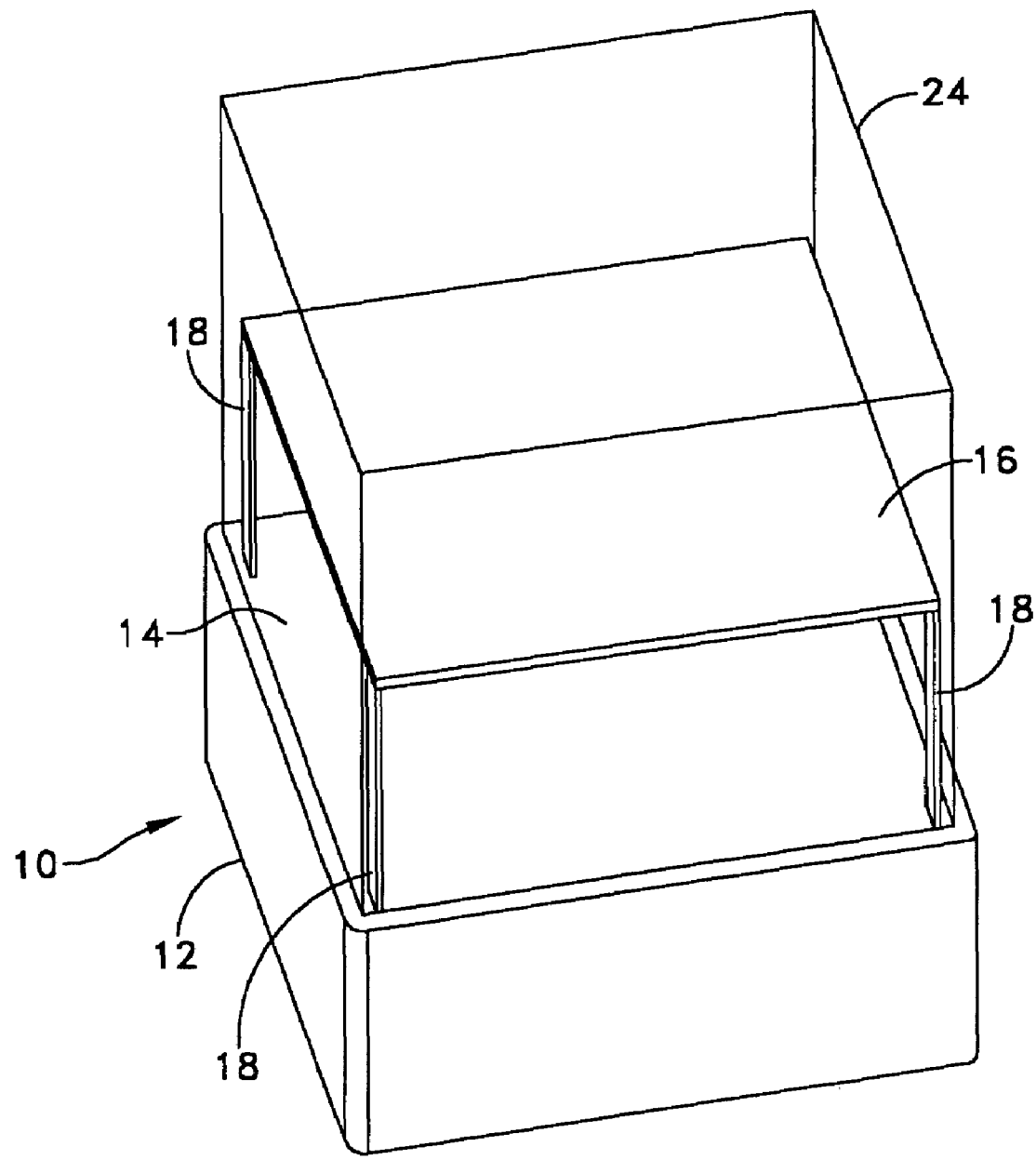
FIG. 1 is a perspective view of a display assembly illustrative of a preferred embodiment of the invention.
Figure 2:
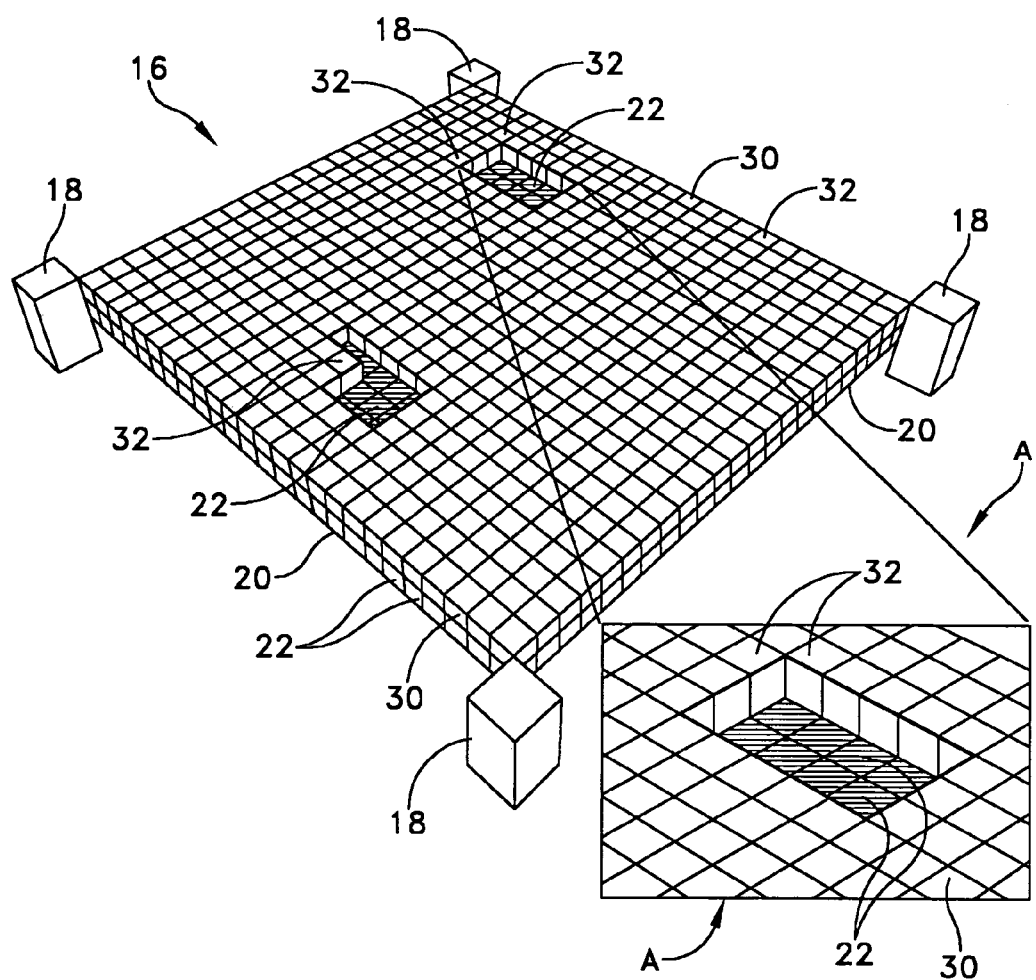
FIGS. 2-7 are diagrammatic illustrations of the effects of operation of the assembly.

Referring to FIG. 1, it will be seen that an assembly for displaying three-dimensional images includes a base portion 10 forming a housing 12 configured to contain electronics and mechanics (not shown) for operation of the assembly during a viewing exercise. The housing 12 is provided with a primary planar surface 14.

A projection member 16, which may be planar as shown in FIG. 1, or may be of a curved, or of other selected configurations, is disposed in a position removed from, and parallel to, the housing planar surface 14, if the projection member is planar. In one embodiment, the projection member 16 comprises a selected one of a color liquid crystal display or the like and a masking layer disposed over the display. In an alternative embodiment, the projection member 16 comprises a phosphor screen or the like adapted to be energized from a rear light projection device, said base portion 10 being adapted to have the projection device mounted thereon. It is to be understood, however, that the invention is not limited to the above-described display embodiments, and is capable of embodiment with all equivalent display technology, including plasma displays and the like. Drive rods 18 that extend from the housing 12 are connected to the projection member 16 and support the projection member 16. A transparent envelope 24 encloses the base portion planar surface 14, the drive rods 18, and the projection member 16. The drive rods 18 are axially extendible and contractible so as to vary the lengths thereof and thereby vary the distance between the projection member 16 and the housing surface 14. In a preferred embodiment, the drive rods 18 comprise a selected one of threaded rods and telescoping rods, facilitating movement of said projection member 16 towards and away from the geometric plane of said base portion 10 and through the parallel geometric planes. The interior of the envelope 24 is placed under a near vacuum to facilitate easy movement of the projection member 16 through the envelope interior. In a preferred embodiment, the surface of the projection member 16, when parallel to the plane of said base portion 10, is viewable through said envelope 24 from 360° around said projection member 16.

FIGS. 2-7 there is illustrated a simplification of the projection member 16. For purposes of illustration, pixels are presented as boxes. In actuality, there are many more pixels than boxes shown in the drawings. In a display pixel layer 20, each box 22 represents a color and brightness controllable pixel. In a masking pixel layer 30, each box 32 represents a masking pixel that is normally dark, but can be rendered transparent. In a preferred embodiment, the masking pixel layer 30 comprises an electronically controlled, computer driven covering disposed over the display pixel layer 20, wherein opacity of each masking pixel 32 is selectively enabled, such that selected pixels 32 of said masking pixel layer 30 are selectively rendered transparent to expose selected pixels 22 in said display pixel layer 20 beneath said masking pixel layer 30.

Because of the thickness of the masking pixel layer 30, viewers from different viewing angles will observe a different set of exposed pixels 22. In the enlarged and removed area A of FIG. 2, it will be seen that if a three by five masking pixel 32 area is made transparent, a viewer from the perspective of the reader sees only a two by four display pixel box 22 area near the far edges. By selectively rendering masking layer pixels 32 transparent, one can control what portions of the display pixel layer 20 are seen from what viewing angles.

Figure 3:
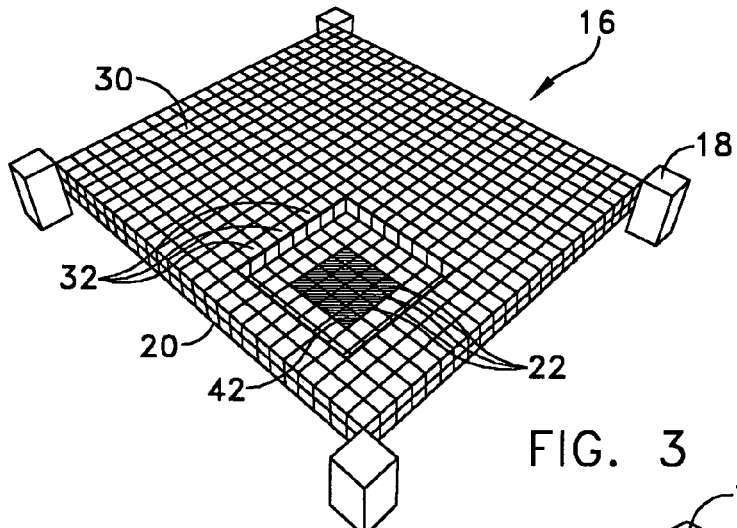
Figure 5:
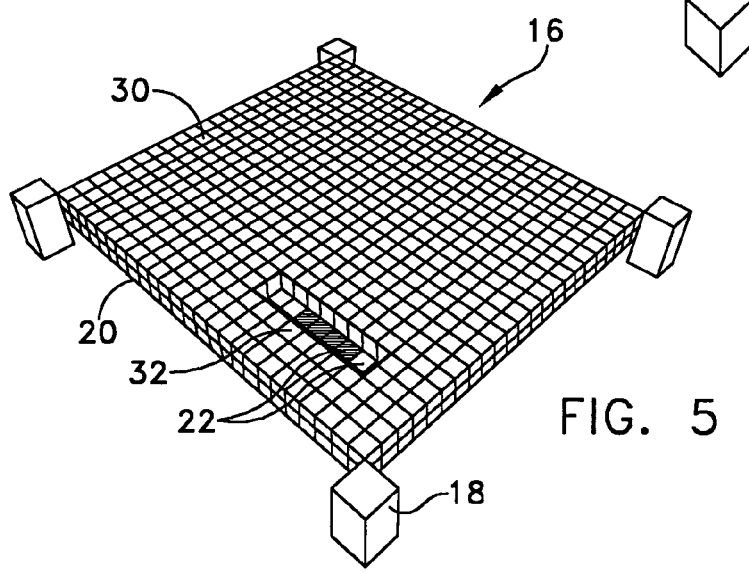
Figure 6:
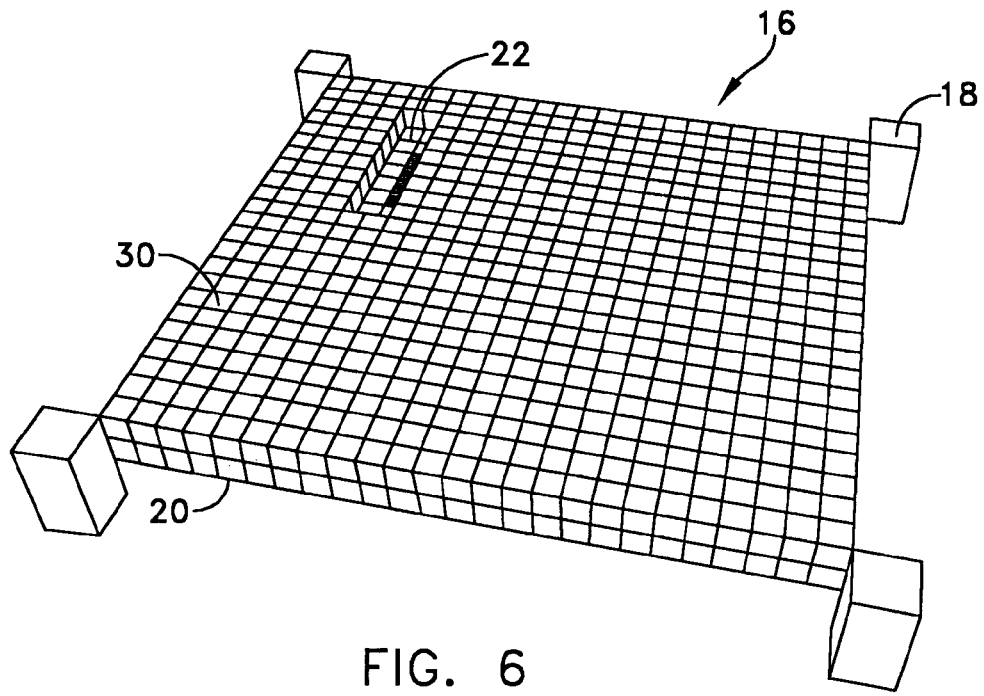
Figure 7:
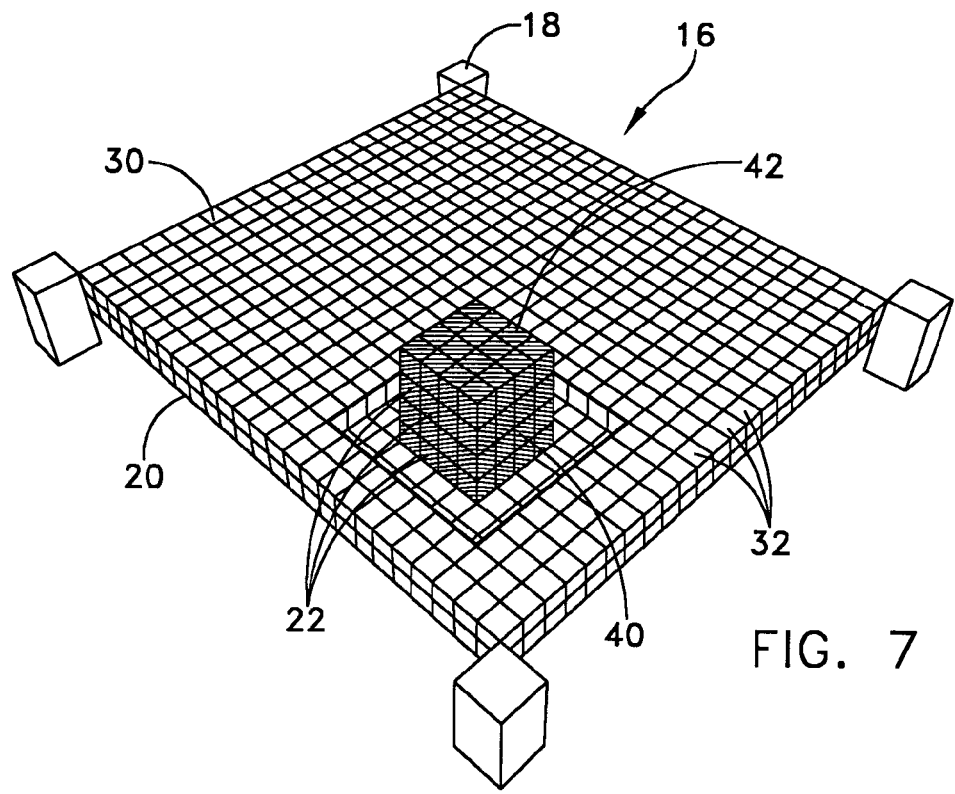

FIGS. 3-7 illustrate stages in displaying a single cube structure 40 (FIG. 7). In FIG. 3, there is shown a configuration of pixels enabled to form a horizontal surface 42 of 4×4 display pixels 22, viewable from 360° around the projection member 16. The 4×4 horizontal surface 42 is illuminated, in known fashion, in a selected color and design. An 8×8 area of masking pixels 32 is made transparent. All of the illuminated pixels 22 are viewable from all angles there around.

Figure 4:
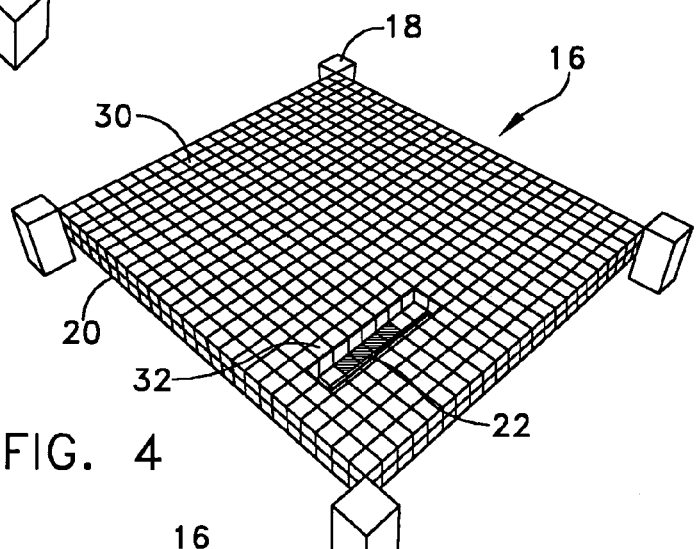

The projection member 16 is then moved by the drive rods 18 to another level, one pixel height lower, at which point four separate projections are made in sequence, one for each viewing quadrant. Two of the quadrants are shown in FIGS. 4 and 5. In FIG. 4, the near right side of the box is drawn for viewers within sight of that quadrant, but masked from viewers opposite to the reader. Then the steps illustrated in FIG. 5 occur, drawing the near left side of the box. In two further steps, the far right and far left sides are similarly drawn, but those illuminated pixels are not viewable to the reader.

If FIG. 6, there is shown what an observer on the other side of the display would see during the writing of the near right (FIG. 4) face of the box. There may develop a small angle where some light from a display pixel would be viewable beyond a desired cutoff point. This can cause a faint ghosting of that wall, but will be reduced with decreasing pixel size and will be reduced as the ratio of depth to width of the masking pixels increases.

In FIG. 7, there is illustrated diagrammatically the result when two or more layers have been drawn. The box structure 40 is not really there, but is a mental image left because of the writing speed of the assembly and the retinal image retention of the eye-brain combination.

Figure 8:
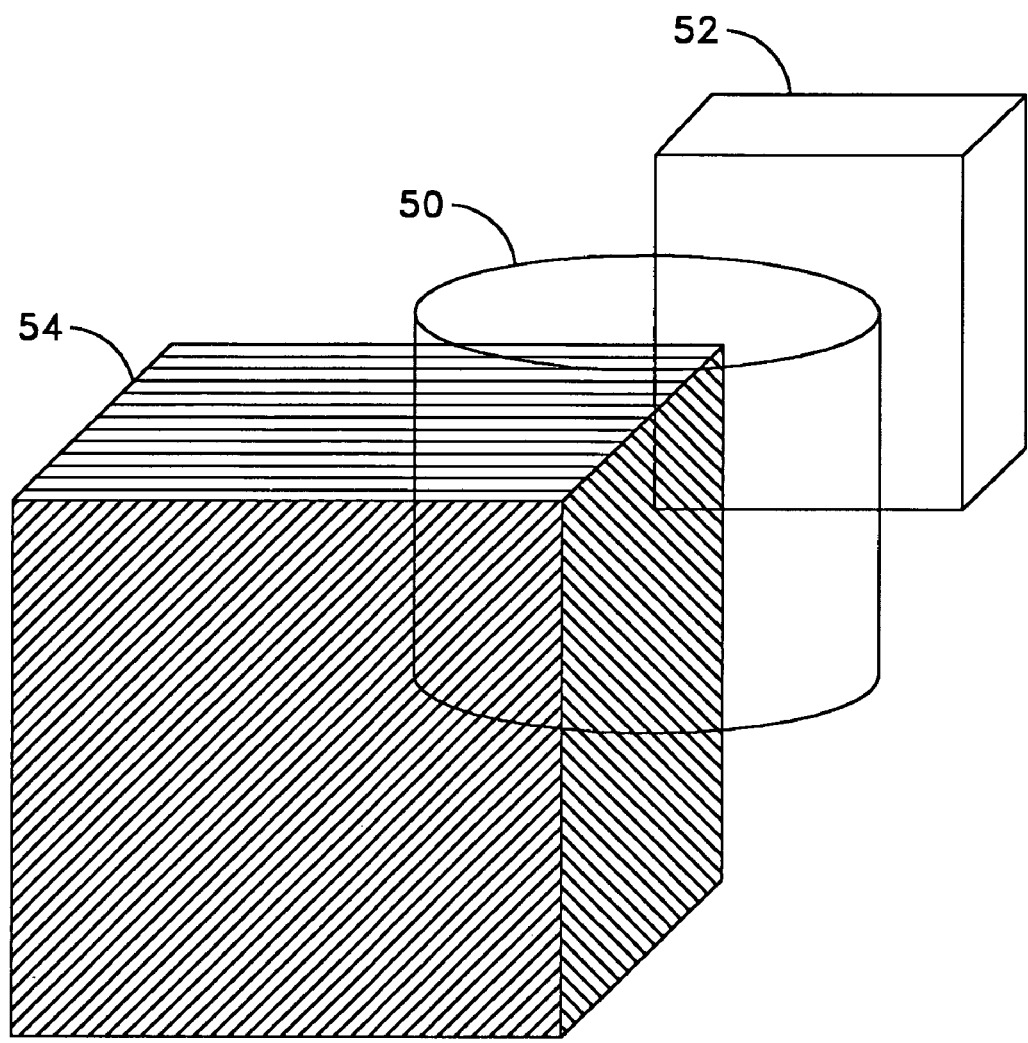
FIG. 8 is a perspective view of an image including a plurality of objects, some with portions hidden from view.

When objects are behind each other, the rear objects, 50, 52 as shown in FIG. 8, cannot be masked, making the nearer objects 52, 54 appear somewhat transparent. However, because of retention of depth perception, the viewer is able readily to see that the objects 50, 52, 54 are spatially separated.

There can thus be provided a full color projection produced in such a manner that the viewing angle around the display chamber determines which display pixels are seen and therefore what surfaces are hidden. This provides the appearance of three-dimensional solid forms with very little distortion and without limitation to a particular horizontal viewing angle. The image has good vertical range of view and the assembly requires no special glasses.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A display assembly for displaying three-dimensional images, the assembly comprising:
   a base portion forming a housing adapted to house electronics and mechanics, and having a planar surface;
   a projection member disposed in a position removed from said base portion planar surface, wherein said projection member comprises a selected one of a color liquid crystal display and a masking layer;
   drive rods extending from said base portion and connected to said projection member, said drive rods being movable by electronics and mechanics disposed in said base portion to move said projection member through planes parallel to the base portion planar surface; and
   a transparent envelope enclosing the base portion planar surface, said drive rods, and said projection member, said envelope being adapted to contain a near vacuum therein.

2. The assembly in accordance with claim 1 wherein said projection member is viewable through said envelope from 360° around said projection member.

3. The assembly in accordance with claim 1 wherein said projection member comprises a phosphor screen adapted to be energized from a rear light projection device, said base portion being adapted to have the projection device mounted thereon.

4. The assembly in accordance with claim 1, wherein said projection member comprises a display pixel layer and extending thereon and thereover, a masking pixel layer.

5. The assembly in accordance with claim 4 wherein said masking pixel layer comprises an electronically controlled, computer driven covering, wherein opacity of each masking pixel is selectively enabled, such that selected pixels of said masking pixel layer are rendered transparent to expose selected pixels in said display pixel layer beneath said masking pixel layer.

6. The assembly in accordance with claim 5 wherein pixels in said display pixel layer are adapted to be illuminated and the masking pixels of said masking layer are sufficiently dark to maximize contrast to illuminated display pixels.

7. The assembly in accordance with claim 1 wherein said drive rods comprise a selected one of threaded rods and telescoping rods, facilitating movement of said projection member towards and away from the plane of said base portion and through the parallel planes.

8. The assembly in accordance with claim 7 wherein said projection member is of a rectangular configuration and said drive rods are each connected to said projection member at a corner of said projection member.

9. A display for displaying three-dimensional images, the assembly comprising:
   a base portion forming a housing adapted to house electronics and mechanics, and having a planar surface;
   a projection member disposed in a position removed from said base portion planar surface, wherein said projection member comprises a selected one of a color liquid crystal display and a masking layer, wherein said projection member is of a planar configuration;
   drive rods extending from said base portion and connected to said projection member, said drive rods being movable by electronics and mechanics disposed in said base portion to move said projection member through planes parallel to the base portion planar surface; and
   a transparent envelope enclosing the base portion planar surface, said drive rods, and said projection member, said envelope being adapted to contain a near vacuum therein.

10. The assembly in accordance with claim 9 wherein said projection surface member, when parallel to the plane of said base portion, is viewable through said envelope from 360° around said projection member.

11. The assembly in accordance with claim 9 wherein said projection member comprises a phosphor screen adapted to be energized from a rear light projection device, said base portion being adapted to have the projection device mounted thereon.

12. The assembly in accordance with claim 9, wherein said projection member comprises a display pixel layer and extending thereon and thereover, a masking pixel layer.

13. The assembly in accordance with claim 12 wherein said masking pixel layer comprises an electronically controlled, computer driven covering, wherein opacity of each masking pixel is selectively enabled, such that selected pixels of said masking pixel layer are rendered transparent to expose selected pixels in said display pixel layer beneath said masking pixel layer.

14. The assembly in accordance with claim 13 wherein pixels in said display pixel layers are adapted to be illuminated and the masking pixels of said masking layer are sufficiently dark to maximize contrast to illuminated display pixels.

15. The assembly in accordance with claim 10 wherein said drive rods comprise a selected one of threaded rods and telescoping rods, facilitating movement of said projection member towards and away from the plane of said base portion and through the parallel planes.

* * * * *